US012017231B2

(12) United States Patent
Guerrero Palma et al.

(10) Patent No.: US 12,017,231 B2
(45) Date of Patent: Jun. 25, 2024

(54) ROLLER MILL WITH A SYNCHRONISING DEVICE

(71) Applicants: thyssenkrupp Industrial Solutions AG, Essen (DE); thyssenkrupp AG, Essen (DE)

(72) Inventors: Pedro Guerrero Palma, Lippetal (DE); Alexander Peters, Beckum (DE)

(73) Assignee: FLSmidth A/S (DK)

( * ) Notice: Subject to any disclaimer, the term of this patent is extended or adjusted under 35 U.S.C. 154(b) by 305 days.

(21) Appl. No.: 17/633,101

(22) PCT Filed: Jul. 31, 2020

(86) PCT No.: PCT/EP2020/071623
§ 371 (c)(1),
(2) Date: Feb. 4, 2022

(87) PCT Pub. No.: WO2021/023643
PCT Pub. Date: Feb. 11, 2021

(65) Prior Publication Data

US 2022/0331811 A1 Oct. 20, 2022

(30) Foreign Application Priority Data

Aug. 7, 2019 (BE) .................................. 2019/5509
Aug. 7, 2019 (DE) ..................... 10 2019 211 851.8

(51) Int. Cl.

*B02C 4/32* (2006.01)
*B02C 4/02* (2006.01)
*B02C 25/00* (2006.01)

(52) U.S. Cl.
CPC ................. *B02C 4/32* (2013.01); *B02C 4/02* (2013.01); *B02C 25/00* (2013.01)

(58) Field of Classification Search
CPC .... B02C 4/02; B02C 4/32; B02C 4/28; B02C 25/00
See application file for complete search history.

(56) References Cited

FOREIGN PATENT DOCUMENTS

CN 105797809 A * 7/2016 .............. B02C 4/32
CN 208 320 928 U 1/2019
(Continued)

OTHER PUBLICATIONS

Translation of CN-109482265 (Year: 2019).*
(Continued)

*Primary Examiner* — Bobby Yeonjin Kim
(74) *Attorney, Agent, or Firm* — Jeffrey A. Sharp

(57) ABSTRACT

A roller mill for comminution of bulk material may include a first grinding roller and a second grinding roller that are arranged opposite one another and are configured to be driven in opposite directions. The grinding rollers may be positioned with a grinding gap therebetween. A fixed bearing unit may be configured to hold the second grinding roller, and a floating bearing unit may be configured to hold the first grinding roller. Attached to the floating bearing unit are hydraulic actuators for applying a force to the floating bearing unit. The hydraulic actuators are hydraulically connected to a synchronization device. The synchronization device has a plurality of hydraulic cylinders, each having a piston. The pistons may be connected to one another via a mechanical coupling such that movements of the pistons are coupled.

14 Claims, 5 Drawing Sheets

(56) References Cited

FOREIGN PATENT DOCUMENTS

| | | | | | |
|---|---|---|---|---|---|
| CN | 109482265 | A | * | 3/2019 | ............. B02C 25/00 |
| DE | 39 30 773 | A1 | | 3/1991 | |
| DE | 195 22 251 | A1 | | 12/1996 | |
| DE | 19522251 | A1 | * | 12/1996 | ............... B02C 4/32 |

OTHER PUBLICATIONS

Translation of CN-105797809 (Year: 2016).*
Translation of DE-19522251 (Year: 1996).*
English Translation of International Search Report issued in PCT/EP2020/071623, dated Sep. 28, 2020.

* cited by examiner

ROLLER MILL WITH A SYNCHRONISING DEVICE

CROSS REFERENCE TO RELATED APPLICATIONS

This application is a U.S. National Stage Entry of International Patent Application Serial Number PCT/EP2020/071623, filed Jul. 31, 2020, which claims priority to German Patent Application No. DE 10 2019 211 851.8, filed Aug. 7, 2019, and Belgian Patent Application No. 2019/5509, filed Aug. 7, 2019, the entire contents of all of which are incorporated herein by reference.

FIELD

The present disclosure generally relates to roller mills for the comminution of bulk material, including roller mills with two grinding rollers that are connected to a synchronization device.

BACKGROUND

Roller mills are conventionally used for the comminution of material to be ground, such as, for example, limestone, clinker, ore or similar rocks. A roller mill conventionally has two grinding rollers, which are arranged parallel to one another and are rotatable in opposite directions, wherein a grinding gap for the comminution of the material is formed between the grinding rollers. DE 39 30 773 A1 discloses a roller mill having a fixedly mounted grinding roller and a grinding roller mounted in a floating manner, wherein the floating bearings are in each case connected to hydraulic cylinders.

During operation of the roller mill, the grinding rollers are often loaded unevenly, which is due, for example, to uneven wear of the surface of the grinding rollers or to materials having different properties and grain sizes. Such uneven loading leads to misalignment of the grinding rollers, wherein the grinding rollers are not arranged parallel to one another. Increased misalignment results in uneven wear of or in damage to the grinding roller, wherein in particular edge elements mounted at the roller ends are damaged or destroyed.

Thus, a need exists for a roller mill that reliably prevents damage to the roller mill caused by misalignment of the grinding rollers.

DETAILED DESCRIPTION

Figure 1:
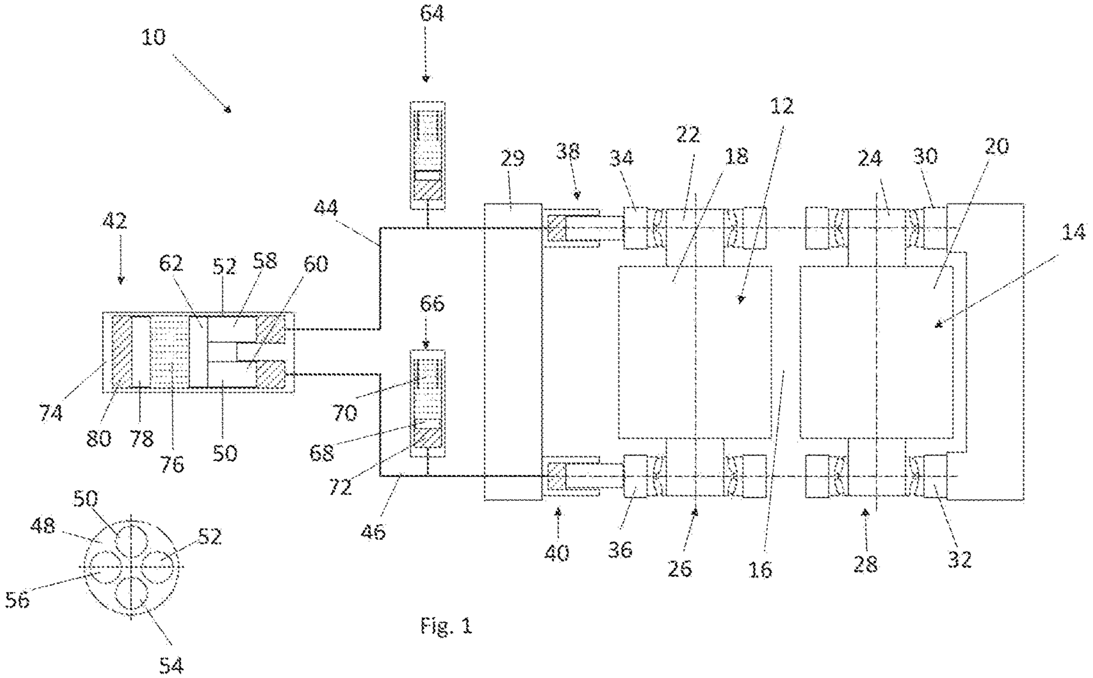
FIG. 1 is a schematic, longitudinal sectional view of an example roller mill having a synchronization device.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to a first aspect, a roller mill for the comminution of bulk material comprises a first grinding roller and a second grinding roller, which are arranged opposite one another and can be driven in opposite directions, wherein a grinding gap is formed between the grinding rollers. The roller mill also has a fixed bearing unit for holding the second grinding roller and a floating bearing unit for holding the first grinding roller, wherein there is attached to the floating bearing unit a plurality of hydraulic actuators for moving the floating bearing unit and/or applying a force, for example the grinding force, to the floating bearing unit. The roller mill further has a synchronization device, which is hydraulically connected to the hydraulic actuators. The synchronization device has a plurality of hydraulic cylinders each having a piston, wherein the pistons are connected to one another via a mechanical coupling so that the movements of the pistons are coupled.

The synchronization device is in particular configured such that it couples the movement of the hydraulic actuators. Preferably, the movements of the pistons are coupled by mechanical coupling such that the pistons move at least partially or wholly synchronously to one another. The mechanical coupling is in particular a rigid coupling, to which all the hydraulic cylinders of the synchronization device are fastened. The hydraulic cylinders are in particular arranged parallel to one another. Each hydraulic cylinder has at least one cylinder chamber or a plurality of cylinder chambers. Preferably, each hydraulic cylinder has a hydraulic chamber, which is filled with a hydraulic oil, in particular an incompressible hydraulic oil. The pistons preferably delimit in each case a hydraulic chamber and are mounted so as to be movable in the axial direction inside the cylinder. The hydraulic cylinders of the synchronization device are each connected, for example, via hydraulic lines to one of the hydraulic actuators or to a plurality of the hydraulic actuators, which are preferably attached in an articulated manner to the floating bearing unit. The synchronization device is preferably configured such that it couples the movement of the hydraulic actuators attached to the floating bearing unit.

The floating bearing unit has in particular two bearings, which each hold one end of the first grinding roller. Preferably, each grinding roller has a roller base body and a roller shaft which is coaxial therewith and which protrudes from the roller base body in particular at the end faces thereof. In particular, the roller shaft is held at each of its opposite ends in a bearing of the floating bearing unit. The bearings of the floating bearing unit are preferably movably held on a machine frame of the roller mill, wherein the bearings of the fixed bearing unit are fixedly attached to the machine frame. Preferably, each bearing has a bearing jewel and, attached thereto, a rolling bearing unit having an outer and an inner bearing ring and rolling bodies arranged therebetween. The outer bearing ring is preferably fixedly attached to the bearing jewel. The floating bearing unit and the fixed bearing unit each have two bearing jewels, wherein the bearing jewels of the floating bearing unit are movably held on the machine frame and the bearing jewels of the fixed bearing unit are fastened to the machine frame so that the bearing jewel is not movable relative to the machine frame.

The hydraulic actuator is an actuating element which applies a force to the floating bearing unit and, for example, moves it. Preferably, a hydraulic actuator is attached to each bearing jewel of the floating bearing unit. The hydraulic actuator has, for example, a cylinder with a piston movably mounted therein, wherein a movement of the piston results in a movement of the bearing jewel or in a change to the force acting on the bearing jewel.

A synchronization device having a plurality of hydraulic cylinders, which each have a piston coupled via a mechanical coupling, ensures that the pistons in the respective hydraulic cylinders perform a coupled movement, in particular the same movement, even though the hydraulic pressure applied to the pistons may be different. The hydraulic actuators connected to the synchronization device, for example via hydraulic lines, preferably necessarily likewise perform the same or a coupled movement. It is thus ensured that the hydraulic actuators and thus the bearings of the floating bearing unit each perform the same or a coupled movement and misalignment of the first grinding roller relative to the second grinding roller is limited or prevented.

According to a first embodiment, the floating bearing unit has two bearings, which each hold one end of the first grinding roller, wherein at least one hydraulic actuator, preferably two hydraulic actuators, is/are attached to each bearing and wherein half the hydraulic cylinders of the synchronization device is in each case connected to the hydraulic actuators of a bearing. Preferably, one half of the hydraulic cylinders of the synchronization device is connected only to the hydraulic actuators that are attached to a common bearing of the floating bearing unit, wherein the other half of the hydraulic cylinders of the synchronization device is connected only to the hydraulic actuators of the other bearing of the floating bearing unit. The synchronization device has, for example, four, six, eight, ten, twelve or more hydraulic cylinders. Preferably, the synchronization device has an even number of hydraulic cylinders. The hydraulic cylinders of the synchronization device are preferably connected via hydraulic lines to the hydraulic actuators attached to the floating bearing unit. In particular, each hydraulic cylinder of the synchronization device is connected to exactly one hydraulic actuator. Such a connection of the synchronization device to the hydraulic actuators attached to the floating bearing unit ensures that the hydraulic actuators perform the same or preferably a coupled movement.

According to a further embodiment, the mechanical coupling is in plate form. Preferably, the mechanical coupling comprises a plate, for example a circular plate, which is connected fixedly, preferably in an articulated manner, to the pistons of the hydraulic cylinders. In particular, all the pistons of the synchronization device are fastened to a common mechanical coupling. The hydraulic cylinders of the synchronization device are in particular oriented parallel to one another, wherein the pistons axially displaceable therein are preferably mounted orthogonally to the mechanical coupling in plate form.

According to a further embodiment, each hydraulic cylinder comprises a piston rod, which is attached at one end to the mechanical coupling and at its other end to in each case one of the pistons. Each of the hydraulic cylinders has in particular at least one hydraulic chamber, which is filled with an incompressible hydraulic oil. The piston is preferably movable inside the cylinder and delimits the hydraulic chamber. The hydraulic cylinders are, for example, single-acting hydraulic cylinders, wherein only one of the piston faces comes into contact with the hydraulic fluid. It is likewise conceivable that the hydraulic cylinders are differential cylinders, synchronous cylinders or tandem cylinders.

According to a further embodiment, the piston rod is held on the piston or the mechanical coupling such that the piston rod and the piston or the mechanical coupling are movable relative to one another. Preferably, the piston rod and the mechanical coupling or the piston are linearly movable relative to one another, wherein the movement is in particular limited. For example, a relative movement in only the axial direction of the hydraulic cylinder is possible. By way of example, the piston rod is movable approximately from 2 to 10 cm relative to the mechanical coupling or the piston. This permits limited misalignment of the grinding rollers.

According to a further embodiment, the piston or the mechanical coupling has an elongated hole in which the piston rod is held. Preferably, one end of the piston rod is held in the elongated hole, so that the piston rod is movable in the direction in which the elongated hole extends. The elongated hole extends, for example, in the axial direction of the hydraulic cylinder.

According to a further embodiment, each hydraulic cylinder has a gas chamber, which is delimited by the piston. Preferably, the gas chamber is filled with a compressible gas, such as nitrogen. Each hydraulic cylinder has, for example, two chambers, wherein one chamber is a gas chamber filled with a compressible gas and the other is a hydraulic chamber filled with an incompressible hydraulic oil. The piston preferably separates the gas chamber from the hydraulic chamber. In particular, the hydraulic chamber of each hydraulic cylinder is connected to at least one hydraulic actuator attached to the floating bearing unit. The gas chamber filled with the compressible gas acts as a spring, which acts on the piston. The spring characteristic is adjusted by the choice of the gas, of the volume and of the pressure.

According to a further embodiment, each hydraulic cylinder has a gas chamber and a hydraulic chamber, wherein the gas chamber and the hydraulic chamber are in each case separated by a piston. According to a further embodiment, the piston rod extends through the hydraulic chamber or through the gas chamber. Preferably, the hydraulic chamber is arranged on the side of the hydraulic cylinder facing the mechanical coupling, wherein the piston rod extends through the hydraulic chamber to the mechanical coupling.

According to a further embodiment, at least one buffer unit is arranged between the synchronization device and the hydraulic actuators and is preferably configured such that it limits the movement difference of the hydraulic actuators. Preferably, at least two hydraulic lines are arranged between the synchronization device and the hydraulic actuators, wherein each of the hydraulic lines has a buffer unit, which is preferably configured such that it limits the movement difference of the hydraulic actuators. Preferably, the buffer unit is configured such that it limits the movement difference of the hydraulic actuators relative to one another to a predetermined maximum value. The buffer unit comprises, for example, a cylinder having a gas chamber and a hydraulic chamber, which is connected to the hydraulic line. The gas chamber and the hydraulic chamber are separated by a piston which is movable inside the cylinder. In the case of a rise in the hydraulic pressure, the piston is moved in the direction towards the gas chamber and compresses the gas, such as, for example, nitrogen, contained therein. The gas chamber preferably acts on the piston like a gas spring, wherein the movement of the piston is limited, for example, by a mechanical stop. Such a buffer unit permits slight misalignment of the grinding rollers relative to one another.

According to a further embodiment, the buffer unit is connected parallel to the synchronization device and the hydraulic actuators. For example, the roller mill has exactly one buffer unit. Preferably, the buffer unit is a double-acting hydraulic cylinder having two hydraulic chambers separated by a piston.

According to a further embodiment, the synchronization device has a cylinder with a gas chamber, which is preferably filled with a compressible gas, such as, for example, nitrogen, and wherein the mechanical coupling is in the form of a piston and delimits the gas chamber of the synchronization device. For example, the cylinder additionally has a hydraulic chamber and a further piston, wherein the further piston separates the hydraulic chamber from the gas chamber. The gas chamber preferably serves as a gas spring, which applies a force to the mechanical coupling so that the mechanical coupling is moved. The synchronization device comprises, for example, a gas spring, which is arranged such that it applies a force to the mechanical coupling. Preferably, the mechanical coupling is in the form of a piston, wherein one piston face delimits the gas chamber and the piston rods of the hydraulic cylinders are attached to the other piston face.

FIG. 1 shows a roller mill 10 having a first grinding roller 12 and a second grinding roller 14, wherein the grinding rollers 12, 14 are arranged opposite one another and are rotatable in opposite directions. A grinding gap 16 is formed between the grinding rollers 12, 14. The grinding rollers 12, 14 each have a substantially cylindrical roller base body 18, 20 and a drive shaft 22, 24 arranged coaxially therewith, the ends of which extend in the axial direction preferably beyond the respective roller base body 18, 20. Each of the grinding rollers 12, 14 is held in a bearing unit, wherein the bearing units are supported, for example, on a machine frame 29, which is not shown in full in FIG. 1. The first grinding roller 12 is held in a floating bearing unit 26, wherein the second grinding roller 14 is held in a fixed bearing unit 28. The fixed bearing unit 28 comprises two bearings 30, 32, which are each arranged at opposite roller ends and hold the drive shaft 24. The bearings 30, 32 are fixedly attached to the machine frame 29, so that they absorb forces in particular in the axial and radial direction of the grinding roller 14 and are not movable. The floating bearing unit 26 comprises two bearings 34, 36, which each hold one end of the drive shaft 22 of the first grinding roller 12. The bearings 34, 36 of the floating bearing unit 26 are held on the machine frame 29 such that they are movable linearly, preferably in a sliding manner. The bearings 34, 36 are preferably also fixedly attached in the axial direction of the first grinding roller 12. The bearings 34, 36 of the floating bearing unit 26 are each connected to a hydraulic actuator 38, 40, preferably to two hydraulic actuators. The hydraulic actuators 38, 40 serve in each case to apply to the first grinding roller 12, which is mounted in the floating bearing unit 26, a grinding force in the direction towards the second grinding roller 14. The grinding force is preferably oriented in a direction orthogonal to the delivery of the material into the grinding gap 16, in particular the grinding force runs in the horizontal direction. The floating bearing unit 26 is movable in particular in the direction of the grinding force applied by means of the hydraulic actuators 38, 40.

The hydraulic actuators 38, 40 are each supported with one end on a bearing 34, 36 and with their opposite other end on the machine frame 29. A movement of the respective bearing 34, 36 of the floating bearing unit 26 results in a corresponding movement of the respective hydraulic actuator 38, 40 attached thereto. Each hydraulic actuator preferably has a cylinder and a piston which is movably mounted therein, wherein the movement of the hydraulic actuator is to be understood, for example, as being a movement of the piston inside the cylinder. The roller mill 10 further has a synchronization device 42, which is connected to the hydraulic actuators 38, 40 via hydraulic lines 44, 46. The synchronization device 42 serves to couple, in particular to synchronize, the movement of the hydraulic actuators 38, 40, so that the bearings 34, 36 move in a coupled or the same manner and in particular misalignment of the grinding rollers 12, 14, where the grinding rollers are not oriented parallel to one another, is avoided or preferably limited. In particular, the synchronization device is configured such that a movement of one of the hydraulic actuators results in a corresponding movement of the other of the hydraulic actuators.

Figure 2:
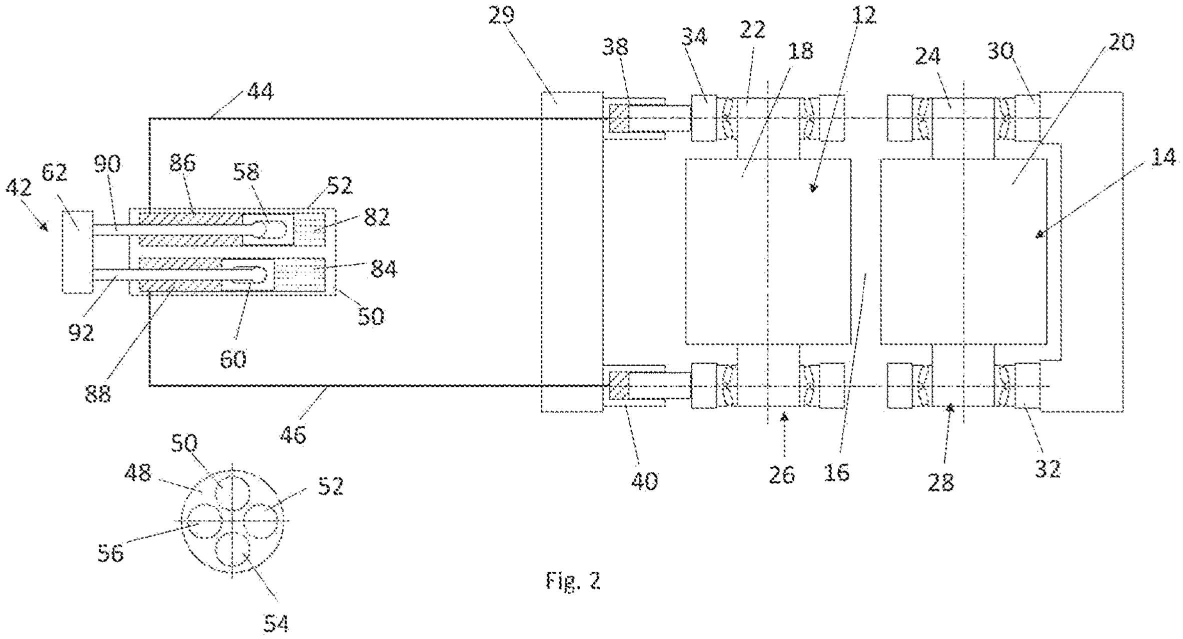
FIG. 2 is a schematic, sectional view of another example roller mill having a synchronization device.

The synchronization device 42 has a plurality of hydraulic cylinders 50, 52, 54, 56. FIG. 2 is a cross-sectional view of the synchronization device 42 with, by way of example, four hydraulic cylinders 50, 52, 54, 56, which are arranged, by way of example, in a housing 48. It is likewise conceivable to provide only two hydraulic cylinders, six, eight or, for example, ten hydraulic cylinders. In each case half the hydraulic cylinders 50 to 56 is connected preferably to only one of the hydraulic actuators 38, 40. For example, in each case one, two or more hydraulic actuators 38, 40 are attached to each bearing 34, 36 of the floating bearing unit 26, wherein in each case half the hydraulic cylinders 50 to 56 of the synchronization device 42 is hydraulically connected preferably to only the hydraulic actuators 38, 40 of in each case one bearing 34, 36. For example, each hydraulic cylinder 50 to 56 of the synchronization device 42 is connected to exactly one hydraulic actuator 38, 40.

A piston 58, 60 is arranged in each of the hydraulic cylinders 50 to 56 so as to be linearly movable. The pistons 58, 60 are connected to one another via a mechanical coupling 62 such that their movement is coupled, wherein the pistons 58, 60 preferably perform a synchronous movement. In particular, all the pistons 58, 60 of the synchronization device 42 are fixedly connected to one another via the mechanical coupling 62. Preferably, the pistons 58, 60 each protrude from the respective hydraulic cylinder 50 to 56 with one end, wherein the end of the piston 58, 60 that protrudes from the hydraulic cylinder is fastened to the mechanical coupling 62.

The mechanical coupling 62 is, for example, a plate to which the pistons 58, 60 are fastened. The pistons 58, 60 are preferably oriented parallel to one another and orthogonally to the mechanical coupling 62, preferably the plate. The hydraulic cylinders 50 to 56 are connected to the hydraulic actuators 38, 40 via the hydraulic lines 44, 46. Preferably, the roller mill 10 has two hydraulic lines 44, 46, wherein one hydraulic line 44 is connected to the hydraulic actuators 38 of one bearing 34 of the floating bearing unit 26 and the other hydraulic line 46 is connected to the hydraulic actuators 40 of the other bearing 36 of the floating bearing unit 26. Preferably, each of the hydraulic lines 44, 46 is connected to only half of the hydraulic cylinders 50 to 56 of the synchronization device 42.

By way of example, the mechanical coupling 62 in the exemplary embodiment of FIG. 1 is in the form of a piston 62, wherein the synchronization device 42 has a cylinder 74 having a gas chamber 76, which is preferably filled with a compressible gas, such as, for example, nitrogen. The gas chamber 76 is delimited, by way of example, by two pistons 62, 78, wherein one of the pistons is preferably the mechanical coupling and the other piston 78 separates the gas chamber 76 from a hydraulic chamber 80. The hydraulic chamber 80 is preferably filled with a non-compressible hydraulic oil and in particular is connected via a hydraulic line to a hydraulic pump, not shown.

In the exemplary embodiment of FIG. 1, a buffer unit 64, 66 is arranged between the synchronization device 42 and each hydraulic actuator 38, 40. The buffer units 38, 40 are each connected via one of the hydraulic lines 44, 46 to the synchronization device 42 and the hydraulic actuators 38, 40. The buffer units 38, 40 are preferably substantially identical in form. Each buffer unit 64, 66 is in particular in the form of a single-acting hydraulic cylinder and has in each case a cylinder with a piston 68, which separates a gas chamber 70 from a hydraulic chamber 72 and is movable inside the cylinder. The gas chamber 70 is preferably filled with a compressible gas, such as, for example, nitrogen, wherein the hydraulic chamber is filled with a non-compressible hydraulic oil and is connected to the respective hydraulic line 44, 46, so that hydraulic oil is able to flow from the respective hydraulic line 44, 46 into the hydraulic chamber 72. The buffer unit 64, 66 serves as a buffer between the synchronization device 42 and the hydraulic actuators, so that the hydraulic actuators 38, 40 are uncoupled from the synchronization device 42 when the movement of the hydraulic actuators does not exceed a specific travel limit value. The travel limit value is preferably a deviation of the position of the hydraulic actuator relative to a zero position which corresponds to the desired size of the grinding gap.

During operation of the roller mill 10, the same hydraulic pressure is first applied to each of the hydraulic actuators 38, 40. In the case of a misalignment of the grinding rollers 12, 14, which can be caused, for example, by uneven loading of the grinding rollers in the grinding process, one of the bearings 34, 36 of the floating bearing unit moves away from the grinding gap 16, so that the hydraulic cylinder 38 or 40 connected to the respective bearing 34 or 36 is moved with the bearing 34, 36. A movement of at least one of the bearings 34, 36 results in a rise in the hydraulic pressure in one of the hydraulic lines 44, 46, wherein the piston 68 is pushed in the direction towards the gas chamber 70, so that the gas contained therein is compressed. The movement of the piston is limited, for example, by a stop in the hydraulic chamber 72 or by the compression limit of the gas, wherein, when the movement limit of the piston 68 is reached, the hydraulic actuators 38, 40 are again coupled with the synchronization device 42. The compressibility of the gas contained in the gas chamber causes a moderate pressure rise. The buffer unit 64, 66 permits a limited travel of the hydraulic actuator 38 or 40, so that a limited misalignment of the grinding rollers 12, 14, where the grinding rollers are no longer parallel, is permitted. Such a limited misalignment prevents damage to the grinding roller, wherein in particular damage to edge elements attached to the roller ends is prevented. As soon as the uneven loading, for example caused by fluctuations in the material composition, has passed, the hydraulic pressure is automatically adjusted to the starting value again by the buffer unit 64, 66.

It is likewise conceivable to configure the roller mill 10 of FIG. 1 without a buffer unit, so that a movement difference of the bearings 34, 36, in particular misalignment of the first grinding roller 12, is prevented completely.

FIG. 2 shows a further exemplary embodiment of a roller mill 10 having a synchronization device 42, wherein the same elements are provided with the same reference signs. The roller mill 10 of FIG. 2, in contrast to the roller mill of the exemplary embodiment of FIG. 1, has an alternative synchronization device 42. The hydraulic cylinders 50 to 56 of the synchronization device 42 each have a gas chamber 82, 84, which is delimited in each case by a piston 58, 60. The pistons 58, 60 of each hydraulic cylinder 50 to 56 separate a gas chamber 82, 84 from a hydraulic chamber 86, 88, wherein the hydraulic chamber 86, 88 is filled with an incompressible hydraulic oil and the gas chamber is filled with a compressible gas, such as, for example, nitrogen. The pistons 58, 60 each have respective piston rods 90, 92, which extend through the respective hydraulic chamber 86, 88 and are fastened to the mechanical coupling 62. The mechanical coupling 62 is, for example, a plate to which the piston rods 90, 92 are fixedly attached. The piston rods 90, 92 are each fastened at one end to the mechanical coupling 62 and held at their other, opposite end on the respective piston 58, 60. Preferably, each of the pistons 58, 60 has an elongated hole 94, 96 in which the end of the respective piston rod 90, 92 is held such that the piston 58, 60 and the piston rod 90, 92 are movable relative to one another in the direction in which the piston rod 90, 92 extends. It is likewise conceivable that the pistons 58, 60 are fixedly connected to the respective piston rods 90, 92 and the mechanical coupling 62 has a plurality of elongated holes in each of which a piston rod 90, 92 is movably held.

In the exemplary embodiment of FIG. 2, the misalignment of the two grinding rollers 12, 14 is made possible by the movable holding of the piston rod 90, 92 in the piston 58, 60 or the mechanical coupling, wherein the length of the elongated hole limits the movement difference of the bearings 36, 36, in particular the maximum misalignment.

Figure 3:
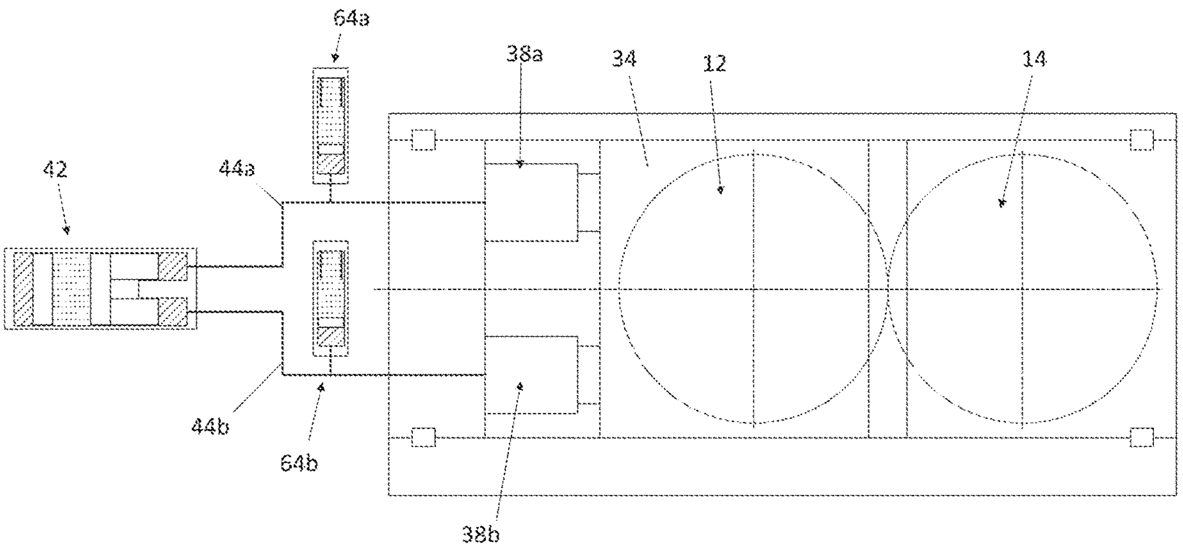
FIG. 3 is a schematic, cross-sectional view of a roller mill having a synchronization device according to the exemplary embodiment of FIG. 1.

FIG. 3 is a cross-sectional view of the roller mill 10 according to FIG. 1, wherein the same elements have the same reference signs. FIG. 3 shows the arrangement of the hydraulic actuators 38*a* and 38*b*, wherein only one of the hydraulic actuators 38 is visible in FIG. 1. By way of example, the hydraulic actuators 38*a* and 38*b* are arranged equally spaced apart from the center line of the grinding roller 12 and are each fastened to the bearing 34 of the floating bearing unit 26. Preferably, each hydraulic actuator 38*a*, 38*b* is connected via a hydraulic line 44*a,b* to exactly one hydraulic cylinder 50 to 56 of the synchronization device 42. Each of the hydraulic lines 44*a,b* has a buffer unit 64*a,b*.

Figure 4:
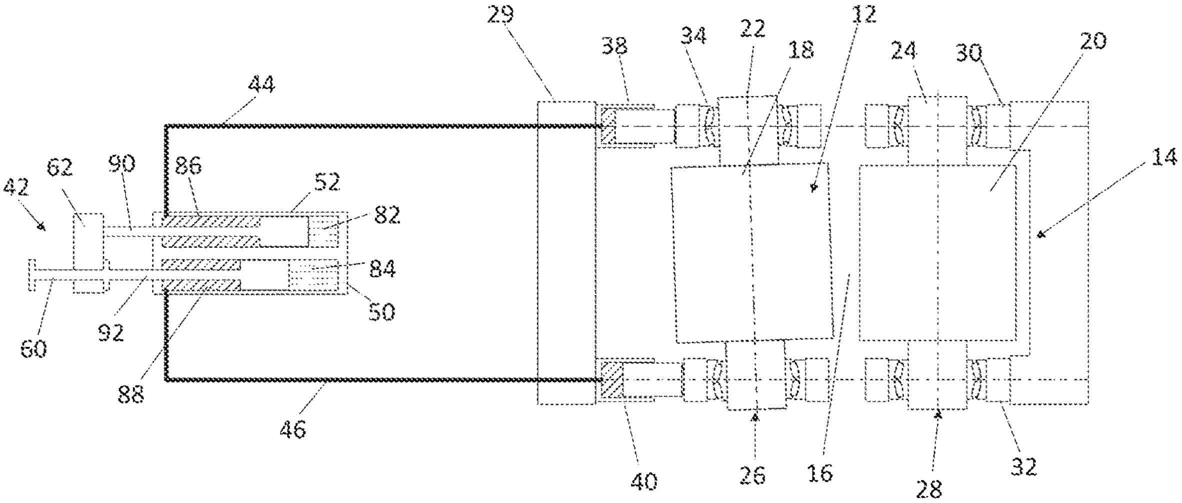
FIG. 4 is a schematic, sectional view of still another example roller mill having a synchronization device.

FIG. 4 shows a further exemplary embodiment of a roller mill 10 having a synchronization device 42, wherein the same elements are provided with the same reference signs. The roller mill 10 of FIG. 4, in contrast to the roller mill of the exemplary embodiment of FIG. 2, has an alternative synchronization device 42. The piston rods 90, 92 are each movably attached at one end to the mechanical coupling 62 and are fastened at their other, opposite end to the respective piston 58, 60, or are formed in one piece therewith. The piston rods 90, 92 each extend, by way of example, through a bore in the mechanical coupling 62. Each piston rod 90, 92 has two stops for limiting the movement of the respective piston rod 90, 92, wherein the mechanical coupling 62 is arranged between the two stops of the piston rod 90, 92. The two stops are spaced apart from one another, so that a movement of the piston rod 90, 92 relative to the mechanical coupling 62 is possible. Preferably, one half of the plurality of piston rods 90, 92 of the synchronization device 42 is movably attached to the mechanical coupling 62 and the other half of the piston rods 90, 92 is fixedly connected to the mechanical coupling 62.

Figure 5:
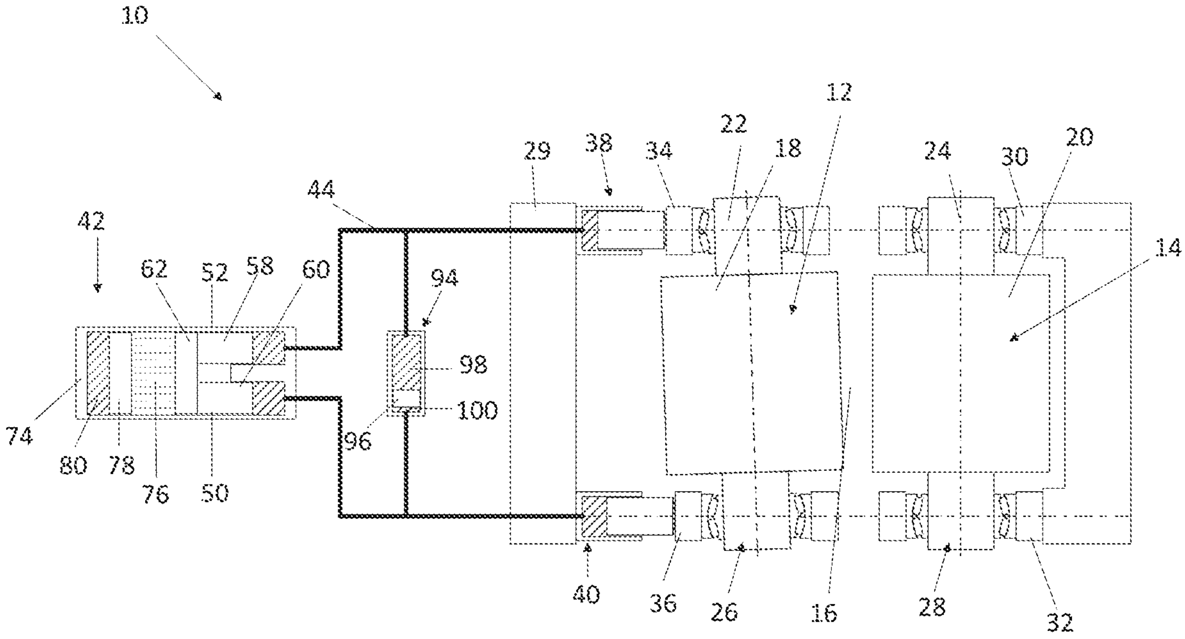
FIG. 5 is a schematic, sectional view of yet another example roller mill having a synchronization device.

FIG. 5 shows a further exemplary embodiment of a roller mill 10 having a synchronization device 42, wherein the same elements are provided with the same reference signs. The roller mill 10 of FIG. 5, in contrast to the roller mill 10 of the exemplary embodiment of FIG. 1, has an alternative buffer unit 94. By way of example, the roller mill 10 of FIG. 5 has only one buffer unit 94, which is connected parallel to the synchronization device 42 and the hydraulic actuators 38, 40. The buffer unit 94 is preferably in the form of a double-acting cylinder, wherein one piston 96 separates two hydraulic chambers 98, 100 from one another. It is likewise conceivable to connect a plurality of buffer units 94 parallel to one another.

LIST OF REFERENCE SIGNS

10 roller mill
12 first grinding roller
14 second grinding roller
16 grinding gap
18 roller base body
20 roller base body
22 drive shaft
24 drive shaft
26 floating bearing unit
28 fixed bearing unit
29 machine frame
30 bearing
32 bearing
34 bearing
36 bearing
38,*a,b* hydraulic actuator
40 hydraulic actuator
42 synchronization device
44,*a,b* hydraulic line
46 hydraulic lines
48 housing
50 hydraulic cylinder
52 hydraulic cylinder
54 hydraulic cylinder
56 hydraulic cylinder
58 piston
60 piston
62 mechanical coupling
64,*a,b* buffer unit
66 buffer unit
68 piston
70 gas chamber
72 hydraulic chamber
74 cylinder
76 gas chamber
78 piston
80 hydraulic chamber
82 gas chamber
84 gas chamber
86 hydraulic chamber
88 hydraulic chamber
90 piston rod
92 piston rods
94 buffer unit
96 piston
98 hydraulic chamber
100 hydraulic chamber

What is claimed is:

1. A roller mill for comminution of bulk material, the roller mill comprising:

a first grinding roller and a second grinding roller arranged opposite one another, wherein the first and second grinding rollers are drivable in opposite directions and are positioned with a grinding gap therebetween;

a fixed bearing unit configured to hold the second grinding roller;

a floating bearing unit configured to hold the first grinding roller;

hydraulic actuators attached to the floating bearing unit, the hydraulic actuators being configured to apply a force to the floating bearing unit; and a synchronization device that is hydraulically connected to the hydraulic actuators, the synchronization device having hydraulic cylinders each of which has a piston, wherein the pistons are connected to one another via a mechanical coupling so that movements of the pistons are coupled.

2. The roller mill of claim 1 wherein the floating bearing unit includes two bearings that each hold an end of the first grinding roller, wherein at least one of the hydraulic actuators is attached to each of the two bearings, wherein half of the hydraulic cylinders of the synchronization device are attached to the at least one hydraulic actuator attached to a first of the two bearings and the other half of the hydraulic cylinders of the synchronization device are attached to the at least one hydraulic actuator attached to a second of the two bearings.

3. The roller mill of claim 1 wherein the mechanical coupling is a plate.

4. The roller mill of claim 1 wherein each hydraulic cylinder has a gas chamber that is delimited by the piston.

5. The roller mill of claim 1 wherein each hydraulic cylinder has a gas chamber and a hydraulic chamber, with the gas chamber and the hydraulic chamber being separated by the piston.

6. The roller mill of claim 1 wherein each of the hydraulic cylinders comprises a piston rod that is attached at a first end to the mechanical coupling and at a second end to one of the pistons.

7. The roller mill of claim 6 wherein each piston rod is held on the piston or the mechanical coupling such that the piston rod and the piston or the mechanical coupling are movable relative to one another.

8. The roller mill of claim 6 wherein each piston or each mechanical coupling has an elongated hole in which the piston rod is held.

9. The roller mill of claim 6 wherein each hydraulic cylinder has a gas chamber and a hydraulic chamber, with the gas chamber and the hydraulic chamber being separated by the piston, wherein the piston rod extends through the hydraulic chamber or through the gas chamber.

10. The roller mill of claim 1 comprising a buffer unit disposed between the synchronization device and the hydraulic actuators, wherein the buffer unit is configured to limit a movement difference of the hydraulic actuators.

11. The roller mill of claim 10 wherein the buffer unit is connected parallel to the synchronization device and the hydraulic actuators.

12. The roller mill of claim 1 wherein the synchronization device includes the hydraulic cylinder with a gas chamber, wherein the mechanical coupling is configured as the piston and delimits the gas chamber of the synchronization device.

13. The roller mill of claim 12 wherein the gas chamber is filled with a compressible gas.

14. The roller mill of claim 13 wherein the compressible gas is nitrogen.

* * * * *